(12) United States Patent
Thurau (10) Patent No.: US 10,557,563 B2
(45) Date of Patent: Feb. 11, 2020

(54) VALVE TOP

(71) Applicant: Fluehs Drehtechnik GmbH, Luedenscheid (DE)

(72) Inventor: Friedrich Thurau, Herscheid (DE)

(73) Assignee: Fluehs Drehtechnik GmbH, Luedenscheid (DE)

( * ) Notice: Subject to any disclaimer, the term of this patent is extended or adjusted under 35 U.S.C. 154(b) by 1 day.

(21) Appl. No.: 16/068,144

(22) PCT Filed: Oct. 24, 2016

(86) PCT No.: PCT/EP2016/075562
§ 371 (c)(1),
(2) Date: Jul. 5, 2018

(87) PCT Pub. No.: WO2017/125176
PCT Pub. Date: Jul. 27, 2017

(65) Prior Publication Data
US 2019/0024820 A1    Jan. 24, 2019

(30) Foreign Application Priority Data

Jan. 19, 2016  (DE) .................... 20 2016 100 236 U (51) Int. Cl.
*F16K 31/56*  (2006.01)
*F16K 31/528* (2006.01)
(Continued)

(52) U.S. Cl.
CPC .............. *F16K 31/563* (2013.01); *F16K 3/08* (2013.01); *F16K 3/24* (2013.01); *F16K 31/5286* (2013.01)

(58) Field of Classification Search
CPC ..... F16K 3/08; F16K 3/24; F16K 3/26; F16K 3/262; F16K 31/563; F16K 31/56;
(Continued)

(56) References Cited

U.S. PATENT DOCUMENTS 1,765,377 A * 6/1930 Marks ................... F16K 31/105
                                                            251/129.2
3,096,966 A * 7/1963 McFarland, Jr. ..... F16K 5/0647
                                                            251/214
(Continued)

FOREIGN PATENT DOCUMENTS

| DE | 42 06 216 A1 | 9/1993 |
| DE | 20 2005 003 127 U1 | 5/2005 |
| DE | 20 2014 101 096 U1 | 4/2014 |

OTHER PUBLICATIONS

International Search Report of PCT/EP2016/075562, dated Jan. 20, 2017.

*Primary Examiner* — Reinaldo Sanchez-Medina
*Assistant Examiner* — David Colon-Morales
(74) *Attorney, Agent, or Firm* — Collard & Roe, P.C.

(57) ABSTRACT

A valve top has a headpiece through which passes axially a spindle that can actuate a valve which is formed by a control disk that can rotate relative to an inlet disk, wherein the lateral surface of the spindle has, circumferentially on its side oriented away from the control disk, a curved path which receives at least one cam of a control sleeve which is arranged secure in rotation, is mounted over the end of the spindle and can be moved axially along the spindle, wherein the curved path is formed such that a vertical displacement of the control sleeve along the spindle brings about a defined rotation of the spindle.

16 Claims, 6 Drawing Sheets

(51) Int. Cl.
*F16K 3/08* (2006.01)
*F16K 3/24* (2006.01)

(58) Field of Classification Search
CPC ............ F16K 31/5286; F16K 31/5284; F16K 31/52475; F16K 31/52483
USPC ........................................ 251/263, 262, 251
See application file for complete search history.

(56) References Cited

U.S. PATENT DOCUMENTS

| | | | |
|---|---|---|---|
| 3,220,695 A * | 11/1965 | Jones | E03C 1/23 251/263 |
| 3,333,815 A | 8/1967 | Downey et al. | |
| 3,780,758 A * | 12/1973 | DeVries | F16K 3/08 137/454.6 |
| 3,831,621 A * | 8/1974 | Anthony | F16K 3/08 137/270 |
| 4,116,216 A * | 9/1978 | Rosenberg | A01G 25/162 137/624.13 |
| 4,221,238 A | 9/1980 | Madsen | |
| 4,568,060 A * | 2/1986 | Sud | F16K 31/52408 251/229 |
| 4,632,361 A | 12/1986 | Callison | |
| 5,094,258 A * | 3/1992 | Orlandi | F16K 3/08 137/454.5 |
| 5,103,857 A * | 4/1992 | Kuhn | F16K 21/04 137/315.13 |
| 6,220,294 B1 * | 4/2001 | Ko | F16K 3/08 137/246 |
| 6,942,195 B2 * | 9/2005 | Kao | E03C 1/0404 251/230 |
| 6,988,512 B1 * | 1/2006 | Wang | F16K 3/08 137/625.47 |
| 7,134,450 B2 * | 11/2006 | Ko | F16K 3/08 137/625.31 |
| 7,264,016 B2 * | 9/2007 | Molina | E03C 1/04 137/454.6 |
| 7,331,359 B2 * | 2/2008 | Shay | F16K 3/08 137/454.2 |
| 7,607,639 B2 * | 10/2009 | Chen | F16K 3/08 137/625.31 |
| 8,474,482 B2 * | 7/2013 | Melle | F16K 11/074 137/625.11 |
| 9,574,336 B1 * | 2/2017 | Maercovich | E03D 5/105 |
| 10,054,240 B2 * | 8/2018 | Thurau | F16K 31/563 |
| 2005/0151106 A1 * | 7/2005 | He | F16K 3/08 251/208 |
| 2006/0192166 A1 | 8/2006 | Lange et al. | |
| 2008/0054210 A1 * | 3/2008 | Smith | F16K 3/08 251/208 |
| 2016/0327175 A1 | 11/2016 | Thurau | |

\* cited by examiner

Section A-A

VALVE TOP

CROSS REFERENCE TO RELATED APPLICATIONS

This application is the National Stage of PCT/EP2016/075562 filed on Oct. 24, 2016, which claims priority under 35 U.S.C. § 119 of German Application No. 20 2016 100 236.2 filed on Jan. 19, 2016, the disclosures of which are incorporated by reference. The international application under PCT article 21(2) was not published in English.

The invention relates to a valve top having a head piece, through which a spindle passes axially, by way of which spindle a valve can be activated, which valve is formed by a control disk that can rotate relative to an inlet disk.

Exit of media from fittings is controlled using valve tops. For this purpose, the valve top is screwed into the housing of a fitting by means of its head piece. A rotating handle or lever is set onto its spindle. In the case of known valve tops (cf. DE 20 2005 003 127 U1), two disks are provided for control of the through-flow, which disks are produced from ceramic material. One of the two disks—control disk—is disposed in the valve top so as to rotate, using a driver that is connected with the spindle. The other disk—inlet disk—is a valve seat disk that is disposed in torque-proof manner. When the control disk is rotated, the disks slide on one another. A sealing ring is disposed on the side that faces the valve seat of the housing, which ring lies against the inlet disk. The sealing ring projects beyond the face surface of the valve top and serves to seal the inlet disk relative to the valve seat of the fitting housing.

Valves of the aforementioned type are used both as shut-off valves and as change-over valves, for example for assigning a stream of water to a bathtub outlet or to a shower outlet. Here, rotation in one direction brings about water feed through a tap or a cascade outlet of a bathtub. Rotation in the opposite direction guides the stream of water through the shower head of a shower. In the design of fittings, operation of the valve top by way of triggers or push buttons is increasingly desired.

This is where the present invention takes its start. The invention is based on the task of making available a valve top that allows valve control by means of a pressing movement instead of a rotational movement. According to the invention, this task is accomplished by means of a valve top having the characteristics of the characterizing part of claim 1.

With the invention, a valve top of the aforementioned type is made available, which allows valve control by means of pressing activation. Because of the fact that a curved track is introduced circumferentially into the mantle surface of the spindle, on its side that is directed counter to the control disk, into which track at least one cam of a control sleeve that is set onto the spindle on the end side, in torque-proof manner, which sleeve can be moved axially along the spindle, an axial movement of the control sleeve is brought about by means of pressure on the control sleeve, and thereby the change-over is achieved. For this purpose, the curved track is configured in such a manner that a defined rotation of the spindle is brought about by means of a vertical displacement of the control sleeve along the spindle.

In a further development of the invention, the control sleeve has two cams that are disposed relative to one another, preferably disposed diametrically opposite one another. As a result, a uniform axial force on the walls of the curved track is achieved, which force brings about the rotational movement of the spindle. Particularly preferably, the cams are formed on the control sleeve.

In an embodiment of the invention, the curved track runs in the form of saw teeth around the mantle surface of the spindle. As a result, a defined rotational movement of the spindle is achieved by means of pressing on the control sleeve once, and this movement can be repeated by means of repeatedly pressing on the control sleeve, in each instance. In contrast, a movement of the control sleeve in the opposite direction does not bring about any rotation of the spindle.

In a further development of the invention, the control sleeve is biased opposite to the control disk by way of a spring element. As a result, an automatic vertical return movement of the control sleeve into the starting position is achieved after activation. Preferably, the spring element is formed by a helical spring, in particular a helical pressure spring.

In a further development of the invention, a guide sleeve is disposed on the head piece, enclosing the curved track of the spindle, in which sleeve the control sleeve is guided so as to be displaced vertically, and through which sleeve the control sleeve projects. As a result, vertical guidance of the control sleeve is achieved. Furthermore, housing-like protection of the curved track introduced into the spindle is achieved by means of the guide sleeve.

In an embodiment of the invention, the inner mantle surface of the guide sleeve has an inner polygon, at least in certain regions, which corresponds to an outer polygon formed on the control sleeve. As a result, a defined guide track of the control sleeve within the guide sleeve is achieved.

In a further embodiment of the invention, the inner mantle surface of the guide sleeve has an inner polygon on the end side, at least in certain regions, which corresponds to an outer polygon formed on the head piece. As a result, torque-proof placement of the guide sleeve on the head piece is achieved.

In a further embodiment of the invention, the inner polygon of the guide sleeve and the outer polygon of the control sleeve as well as the outer polygon of the head piece are configured in irregular manner, in each instance. As a result, defined orientation of guide sleeve, inner sleeve, and head piece is achieved during assembly of the valve top. For this purpose, the contours of inner polygon and outer polygon of the control sleeve, of the guide sleeve, and of the head piece are configured to be identical to one another.

In a further development of the invention the guide sleeve is releasably connected with the head piece in shape-fit manner. As a result, simple assembly is achieved, and disassembly of the valve top for maintenance or repair purposes is made possible.

In an embodiment of the invention, an engagement projection that runs radially around the circumference, at least in certain regions, is formed on the head piece, which projection engages into a catch groove introduced circumferentially into the inner wall of the guide sleeve, at least in certain regions. As a result, simple assembly of the guide sleeve onto the head piece is made possible.

Other further developments and embodiments of the invention are indicated in the remaining dependent claims. An exemplary embodiment of the invention is shown in the drawings and will be described in detail below. The figures show:

Figure 1:
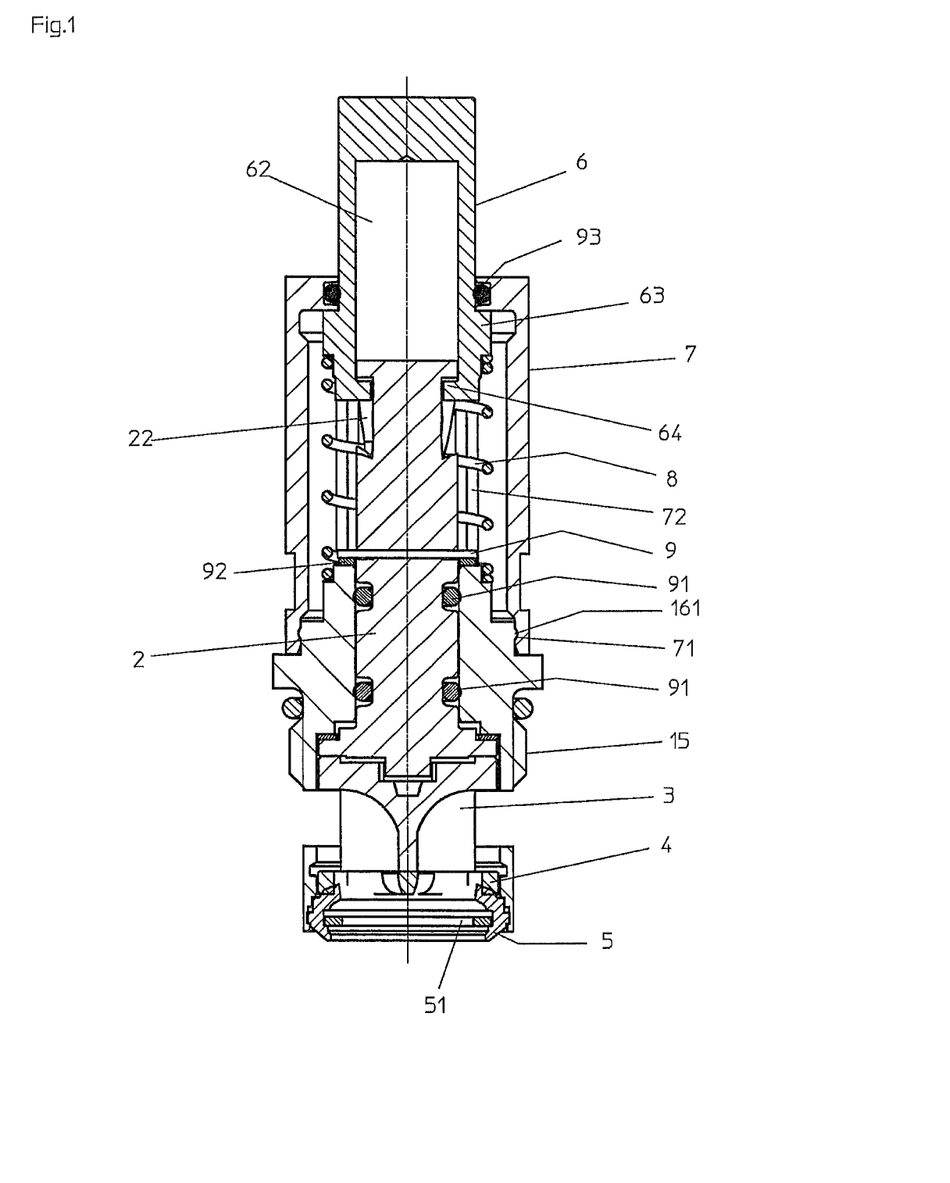
FIG. 1 a schematic representation of a valve top in longitudinal section.

The valve top selected as the exemplary embodiment has a head piece 1, through the center of which a spindle 2, which is guided radially in the head piece, passes axially. A valve can be activated by way of the spindle 2, which valve, during installation of the valve top into the housing of a fitting, comes to lie against the valve seat of the latter. The valve is formed by a control disk 3 and an inlet disk 4. The control disk 3 is connected with the spindle 2 with shape fit and is radially guided in the head piece 1. The inlet disk 4 is disposed in the head piece 1 in torque-proof manner on its side of the control disk 3 that faces away from the spindle 2. The inlet disk 4 is followed by a lip seal 5, which holds a support ring 51 and which comes to lie against the valve seat of the housing of a fitting in the assembled state. A control sleeve 6 is set onto the spindle 2 on its end that faces away from the head piece 1, which sleeve passes through a guide sleeve 7 mounted onto the head piece 1, against which sleeve the control sleeve 6 is biased by way of a helical spring 8.

Figure 3:
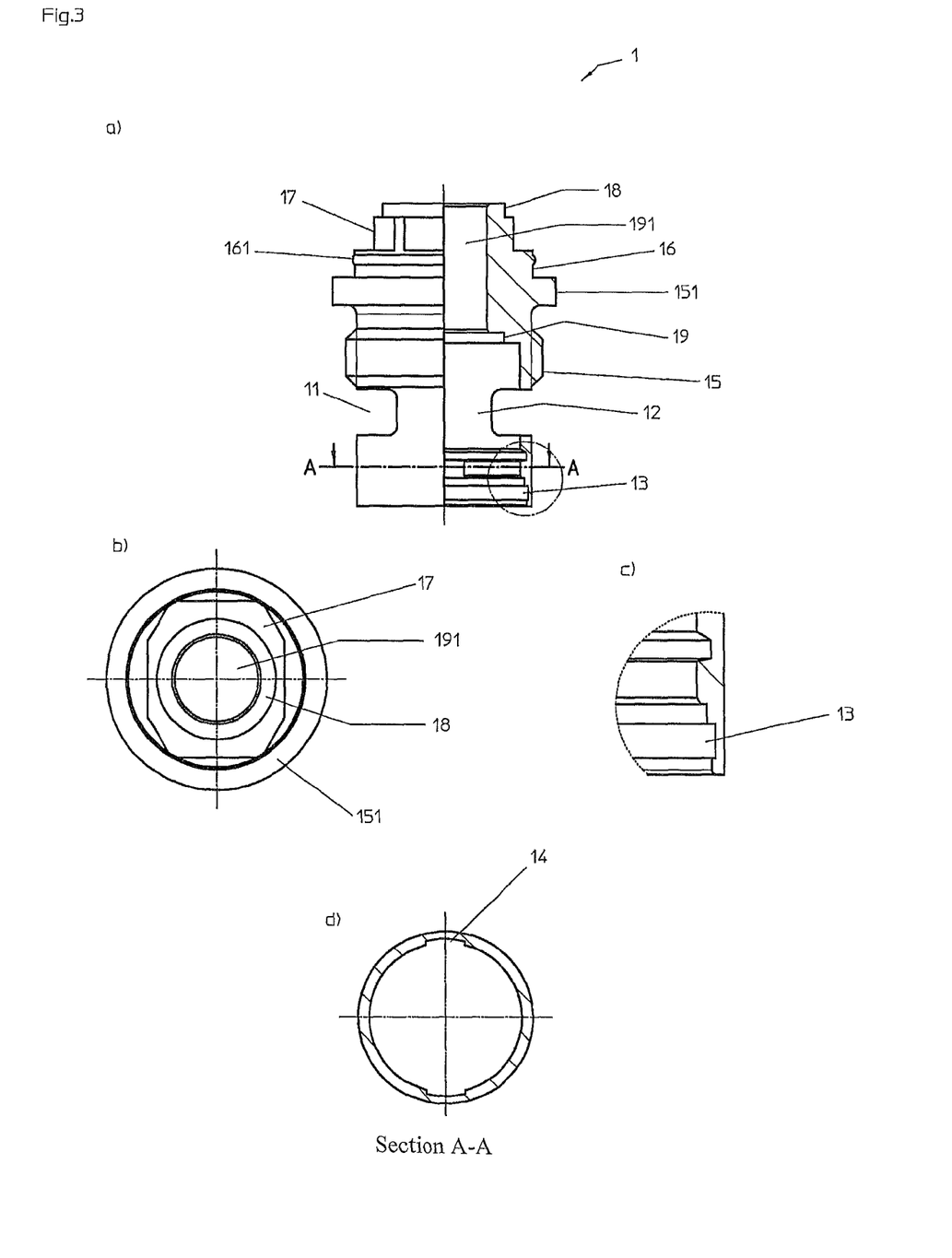
FIG. 3 a schematic representation of the head piece of the valve top from FIG. 1
a) in partial section;
b) in a top view;
c) in a detail representation of the detail "Z";
d) in cross-section A-A.

The head piece 1 consists of a symmetrical hollow body, the two face sides of which are open. On its side facing away from the control sleeve 6, the head piece 1 has two passage windows 11 diametrical to one another, which are delimited by longitudinal crosspieces 12. An undercut 13 for accommodating the lip seal 5 is introduced into the head piece 1 on the inside, at a distance from the passage windows 11. Two diametrically opposite recesses 14 are disposed subsequent to this.

Subsequent to the passage windows 11, the head piece 1 is provided with a connection thread 15 on the outside. Using the connection thread 15, the head piece 1 can be screwed into the housing of a fitting. The connection thread 15 is followed by a circumferential collar 151. A cylindrical section 16 is provided in the head piece 1, at a distance from the collar 151, on which section an engagement ridge 161 is formed circumferentially on the outside. The cylindrical section 16 is followed by a polygonal section 17, which has an irregular octagonal contour in the exemplary embodiment. The polygonal section 17 is followed by a step 18 that reduces the diameter and forms a stop for the helical spring 8. A two-level step 19 is disposed on the inside, at the level of the connection thread 15, which step makes a transition into a diameter-reduced bore 191.

Figure 2:
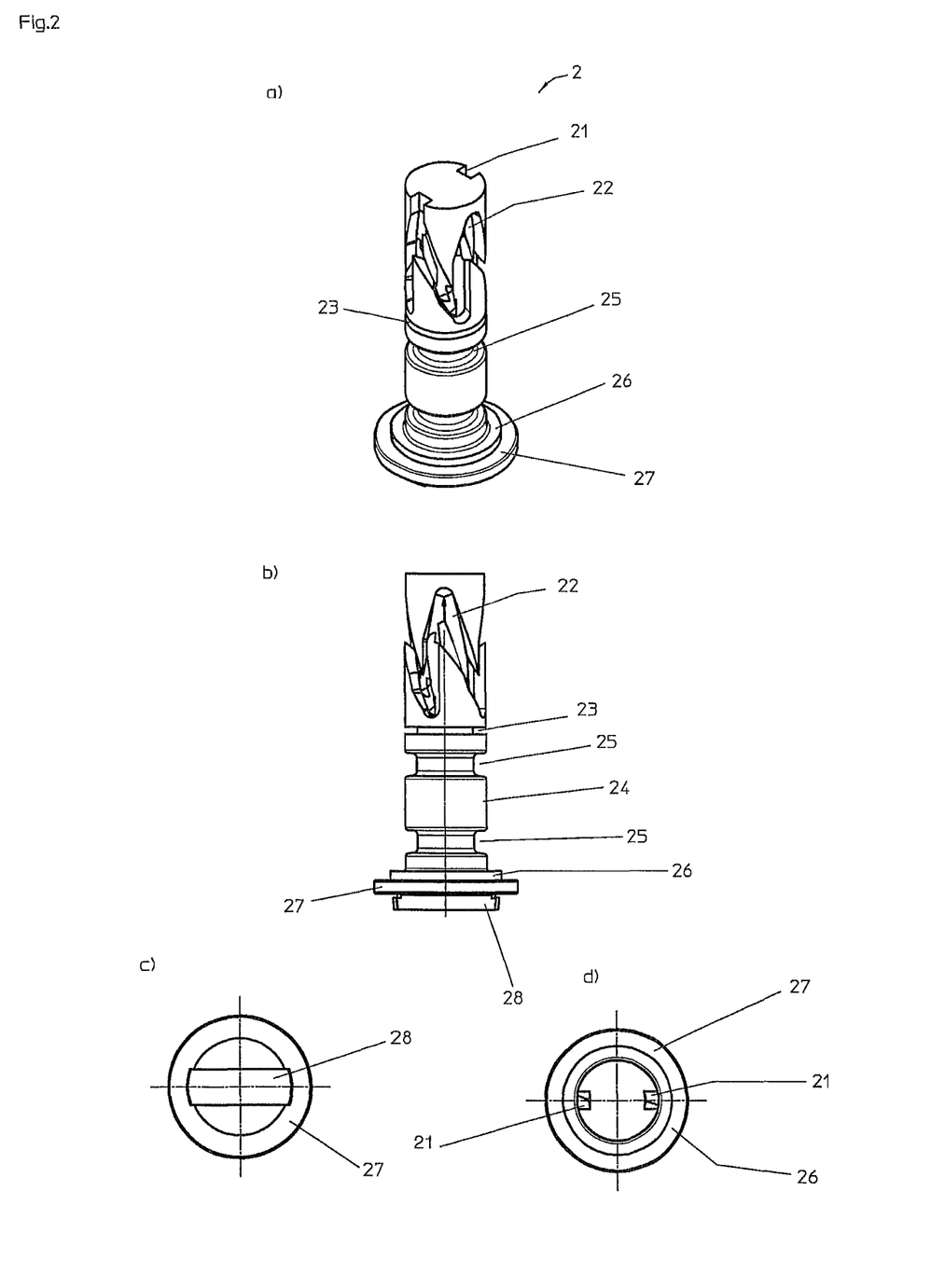
FIG. 2 a schematic representation of the spindle of the valve top from FIG. 1
a) in a spatial representation;
b) in a side view;
c) in a view from below;
d) in a top view.

The spindle 2 is essentially configured to be solid. On its face side facing away from the water inlet, it is provided with two cam introductions 21 disposed diametrically relative to one another, which end in a curved track 22 introduced circumferentially into the mantle surface. The curved track 22 is configured in saw-tooth shape in the exemplary embodiment, wherein four saw teeth offset by 90° relative to one another are provided. The cam introductions 21 each end in the tip of a saw tooth of the curved track 22. A circumferential groove 23 for accommodating a locking ring 9 is disposed at a distance from the curved track 22, followed by a cylindrical section 24. Two plunge cuts 25 for accommodating an O-ring 91 are introduced into the cylindrical section 24. The cylindrical section 24 makes a transition into a step 26 that widens the diameter, followed by a disk 27 that has a driver 28 on its side facing away from the curved track 22.

Figure 6:
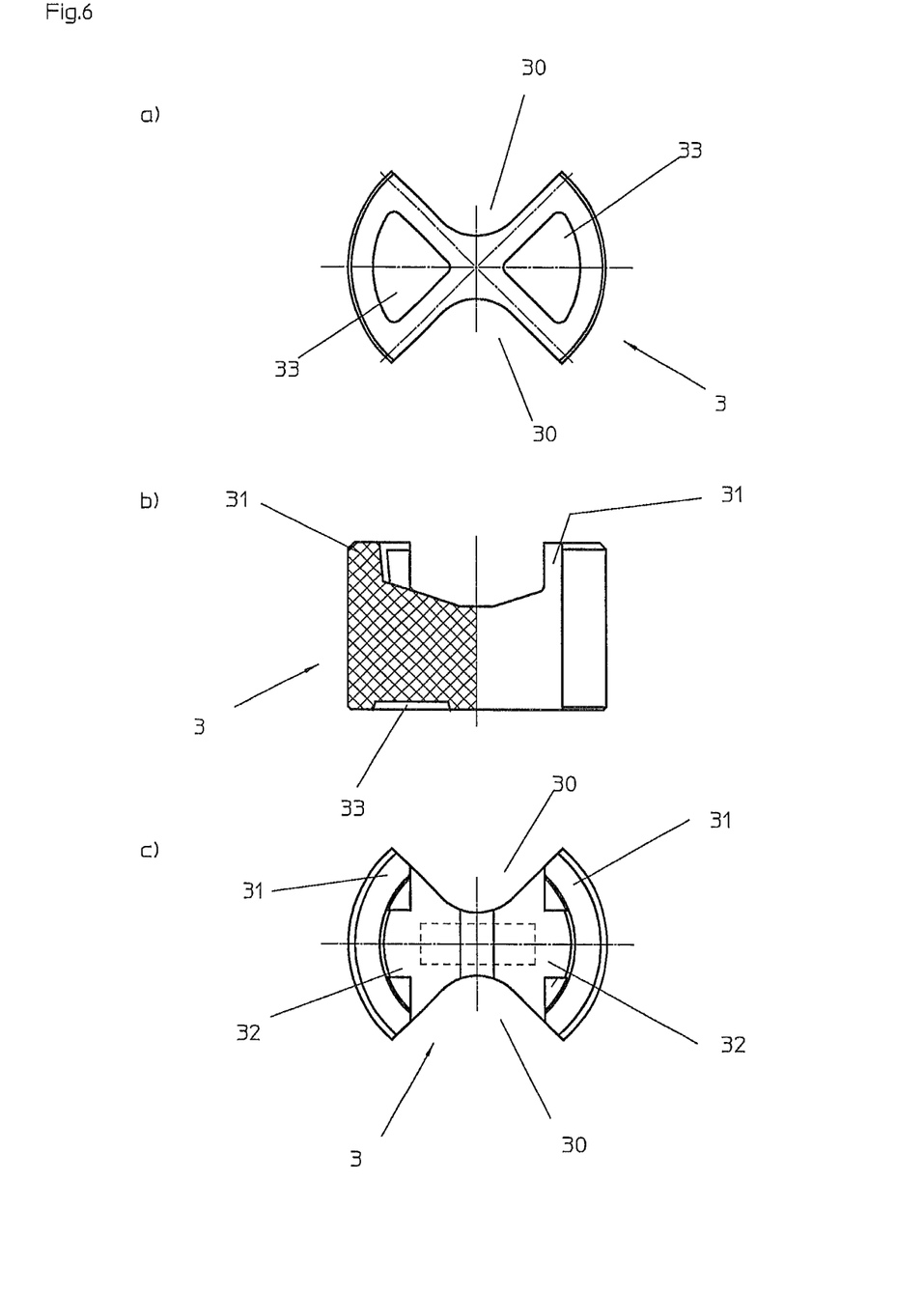
FIG. 6 a schematic representation of the control disk of the valve top from FIG. 1
a) in a view from below;
b) in partial section;
c) in a top view.

The control disk 3 has an essentially barrel-shaped configuration, from which two circular cutouts 30 that lie opposite one another are excluded (cf. FIG. 6). In the exemplary embodiment, the circular cutouts 30 have an angle of about 90°. On its side facing the spindle 2, the control disk 3 has a ring-shaped attachment 31. In the assembled state, the ring-shaped attachment 31 surrounds the driver 28 of the spindle 2. Recesses 32 are formed at the foot of the attachment 31, into which recesses the driver 28 engages. On its face side facing away from the spindle 2, two sector-shaped depressions 33 that lie opposite one another are provided in the control disk 3.

The inlet disk 4 has two projections—not shown—that lie diametrically opposite one another on its circumference, with which it engages into the recesses 14 of the head piece 1. As a result, the inlet disk 4 is held in the head piece 1 in torque-proof manner. The inlet disk 4 has sector-shaped passage openings. In the exemplary embodiment, two passage openings that lie diametrically opposite one another are provided.

Figure 4:
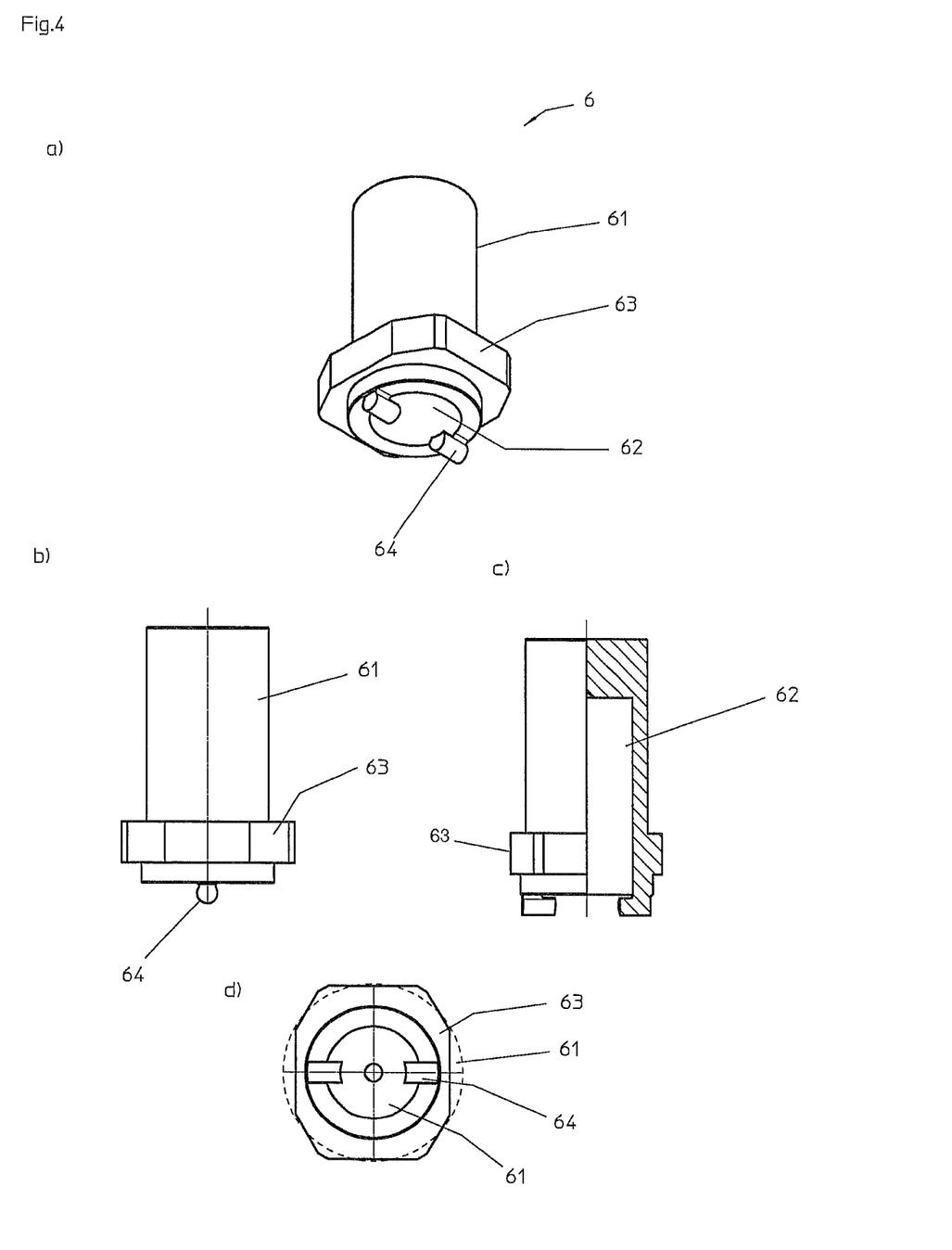
FIG. 4 a schematic representation of the control sleeve of the valve top from FIG. 1
a) in a spatial representation;
b) in a side view;
c) in partial section;
d) in a view from below.

The control sleeve 6 consists essentially of a cylinder piece 61, which is provided with a dead-end bore 62 along its axis of rotation. At a distance from its open end, a circumferential polygonal collar 63 is formed on the outer mantle surface of the control sleeve. The polygonal collar 63 has an irregular polygonal contour, which is configured as an octagon in the exemplary embodiment. On its open face side, two cams 64 are formed on the control sleeve 64, diametrically opposite one another. The cams 64 are configured in cylinder shape and project beyond the face-side ring surface that is delimited by the dead-end bore 62, in the direction of the axis of rotation of the control sleeve 6. The cams 64 thereby engage radially into the region of the dead-end bore 62.

Figure 5:
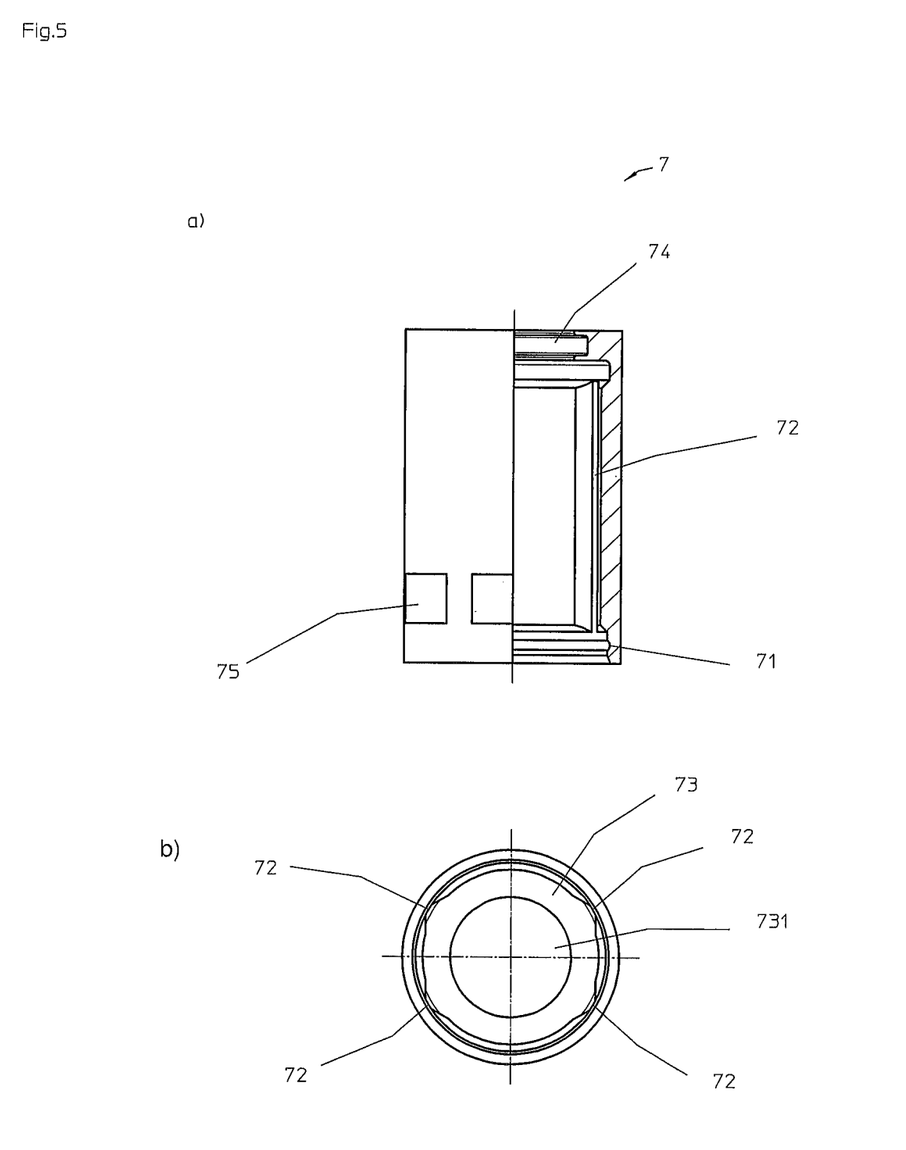
FIG. 5 a schematic representation of the guide sleeve of the valve top from FIG. 1
a) in partial section;
b) in a view from below.

The guide sleeve 7 is configured essentially as a hollow cylinder and has a circumferential catch groove 71 on the inside, on its end that faces the head piece 1, for accommodating the engagement ridge 161 of the head piece 1. Four longitudinal grooves 72 having a triangular cross-section are introduced into the inner mantle surface of the guide sleeve 7, at a distance from the catch groove 71. A polygonal contour for accommodating the polygonal collar 63 of the control sleeve 6 is formed by the longitudinal groove 72, by way of which collar the control sleeve 6 is guided in displaceable manner along the longitudinal grooves 72, within the guide sleeve 7. On its top that lies opposite the catch groove 71, a guide ring 73 that projects inward is formed on the guide sleeve 7, which ring is provided with a plunge cut 74 for accommodating an O-ring 93, framing the passage bore of the guide ring. On its end facing the head piece 1, the guide sleeve 7 furthermore has rectangular contact points 75. The contact points 75 serve for accommodating a handling tool, for example an open-ended wrench.

The spindle 2 lies against the two-level step 19 of the head piece 1 with its step 26, and is held axially in the head piece 1 by way of the locking ring 9, which is configured as a split ring in the exemplary embodiment and engages into the groove 23 of the spindle 2. A disk 92 configured in the form of a slide ring is disposed between the locking ring 9 and the head piece 1. The control sleeve 6 is set onto the part of the spindle 2 that projects out of the head piece 1, wherein the cams 64 of the control sleeve 6 are introduced into the curved track 22 of the spindle 2 through the cam insertions 21. Furthermore, the guide sleeve 7 is set onto the head piece 1, wherein the engagement ridge 161 of the cylindrical section 16 of the head piece 1 engages into the catch groove 71 of the guide sleeve 7, thereby connecting the guide sleeve 7 with the head piece 1 with shape fit and in releasable manner. In this regard, the cylinder piece 61 of the control sleeve 6 passes through the bore 731 of the guide ring 73 of the guide sleeve 7, wherein the polygonal collar 63 of the control sleeve 6 is mounted in the longitudinal grooves 72 of the guide sleeve 7 in displaceable manner. The control sleeve 6 is biased against the guide ring 73 of the guide sleeve 7 with its polygonal collar 63, by way of the helical spring 8.

To activate the valve top, the control sleeve 6 is pressed in the direction of the head piece 1, thereby moving the cams 64 formed on the control sleeve 6 along the curved track 22 of the spindle 2. The control sleeve 6 is guided in the guide sleeve 7 in torque-proof manner by way of the polygonal collar 63, so that the spindle 2 is rotated about its axis of rotation by the movement of the cams 64 along the curved track 22. In the exemplary embodiment, a rotation of the spindle by 90° is brought about by activation of the control sleeve 6. By means of the rotation of the spindle 2, the control disk 3, which is connected with it with shape fit, is moved, so to speak, relative to the inlet disk 4 that is disposed in the head piece 1 in torque-proof manner, and thereby activation of the valve formed by the control disk 3 and the inlet disk 4 is brought about. After activation of the control sleeve 6, the latter is brought back into its starting position by way of the reset forces of the helical spring 8. Because of the saw-tooth-shaped configuration of the curved track 22 of the spindle 2, no rotation of the spindle 2 is brought about by the upward movement of the control sleeve 6 or of the cams 64 formed on it, within the curved track 22. The valve top remains open. By pressing on the control sleeve 6 in the direction of the head piece 1 once again, rotation of the spindle 2 as well as of the control disk 3 connected with it with shape fit in turn brings about rotation by 90° in the same direction of rotation relative to the inlet disk 4, thereby closing the valve top.

The invention claimed is:

1. A valve top comprising:
   a head piece;
   a spindle axially extending through the head piece and having a first side, an end side, and a mantle surface with a curved track in the mantle surface on the first side;
   an inlet disk;
   a valve activatable by the spindle and comprising a control disk rotatable relative to the inlet disk and disposed opposite the first side of the spindle; and
   a control sleeve on the end side of the spindle, axially movable along the spindle, and comprising at least one cam engaging into the curved track in a torque-proof manner;
   wherein the curved track is configured in such a manner that an axial displacement of the control sleeve along the spindle causes a defined rotation of the spindle.

2. The valve top according to claim 1, wherein the control sleeve has two cams.

3. The valve top according to claim 1, wherein the curved track runs in the form of saw teeth around the mantle surface of the spindle.

4. The valve top according to claim 1, wherein the control sleeve is biased opposite to the control disk, by way of a spring element.

5. The valve top according to claim 1, further comprising a guide sleeve disposed on the head piece and enclosing the curved track of the spindle;
   wherein the control sleeve is guided in the guide sleeve so as to be displaced vertically; and
   wherein the control sleeve projects through the guide sleeve.

6. The valve top according to claim 5, wherein an inner mantle surface of the guide sleeve has an inner polygon, at least in certain regions, which corresponds to an outer polygon formed on the control sleeve.

7. The valve top according to claim 5,
   wherein the guide sleeve has a guide sleeve end side and an inner mantle surface; and
   wherein the inner mantle surface of the guide sleeve has an inner polygon on the guide sleeve end side, at least in certain regions, which corresponds to an outer polygon formed on the head piece.

8. The valve top according to claim 6, wherein the inner polygon of the guide sleeve and the outer polygon of the control sleeve are irregular polygons.

9. The valve top according to claim 6, wherein the inner polygon of the guide sleeve and the outer polygon of the control sleeve have identical contours.

10. The valve top according to claim 5, wherein the guide sleeve is connected with the head piece in releasable manner.

11. The valve top according to claim 5, further comprising an engagement projection extending radially around a circumference of the head piece, at least in certain regions, and engaging into a catch groove introduced circumferentially into an inner wall of the guide sleeve, at least in certain regions.

12. The valve top according to claim 2, wherein the two cams are disposed diametrically relative to one another.

13. The valve top according to claim 2, wherein the two cams are formed on the control sleeve.

14. The valve top according to claim 4, wherein the spring element comprises a helical spring.

15. The valve top according to claim 7, wherein the inner polygon of the guide sleeve and the outer polygon of the head piece are irregular polygons.

16. The valve top according to claim 7, wherein the inner polygon of the guide sleeve and the outer polygon of the head piece have identical contours.

* * * * *